Figure 1:
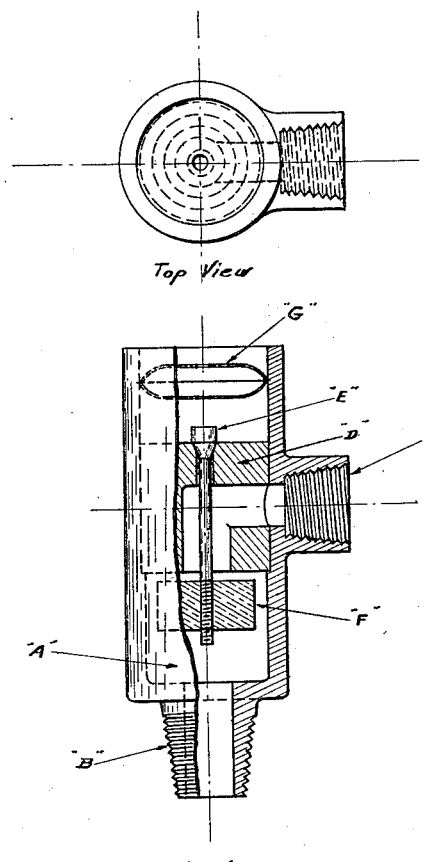

H. T. BATTIN.
WARNING VALVE.
APPLICATION FILED JAN. 4, 1921.

1,403,066.

Patented Jan. 10, 1922.

Top View

WITNESSES.
Prudence Battin
Walton Storm

Harold T. Battin
INVENTOR.

UNITED STATES PATENT OFFICE.

HAROLD T. BATTIN, OF NEW YORK, N. Y.

WARNING VALVE.

1,403,066. Specification of Letters Patent. Patented Jan. 10, 1922.

Application filed January 4, 1921. Serial No. 434,963.

*To all whom it may concern:*

Be it known that I, HAROLD T. BATTIN, a citizen of the United States, residing at New York, county of New York, State of New York, have invented an Improvement in Warning Valves, of which the following is a specification.

This invention has for its object, to provide a simple and inexpensive device for vacuum systems, adapted for general use, as upon machinery, automobiles, aeroplanes, etc., which will give audible or visible warning, automatically, whenever the vacuum or partial vacuum is broken, and stop the warning when the vacuum is restored.

With the above and other objects in view, I have devised the novel warning valve, of which the following description together with the accompanying drawing is a specification, reference characters being used to denote the various parts.

The figure shows a sectional elevation of my warning valve. The elevation is broken on the sectional line, so as to show the interior construction of the valve more clearly. Above this sectional elevation is shown a top view of the valve. The sectional elevation shows a warning valve housing "A" having a vacuum system connection "B" and a suction connection "C." Within this housing is shown a valve seat "D," containing a small valve "E," in the upper chamber, the stem of which is extended to connect with a larger valve "F," in the lower chamber, in such a manner that, whenever one valve is closed the other valve will be open. In the upper chamber a whistle "G" is shown, which gives the warning, for which the valve was designed.

In operation my novel warning valve is used on any system where a vacuum is created by means of a suction, and is explained as follows:—

Whenever a vacuum producing device creates a force in my warning valve, which acts through the connections "B" and "C" and the common passage in the valve seat "D," it will create a partial vacuum in the valve housing "A" and connections. The effect of this will be to close the valve "E," which is in the upper chamber, where there is no vacuum, due to the air opening through the warning device, opening the valve "F" into the lower chamber, where there is a partial vacuum under normal conditions. The valve "E," will remain closed until the vacuum in the lower chamber is broken, by the in-rush of air, through the connection "B," due to a leak or the failure of the supply of gas or liquid, when the suction through the common passage, will draw the larger valve "F" closed, opening the smaller valve "E," which is on a rod or stem connecting both "E" and "F," which valves may be of several types or number, and allow air to be drawn through the upper chamber and the opening in the valve "E," by means of which a warning device may be operated. A whistle "G" is shown as one type of warning device which may be operated by the suction of this air. By the terms large and small valves are meant the relative sizes of the openings for the passage of air, through the valves.

One use of the device would be on any system where vacuum suction is used to draw a liquid from one tank to another. So long as the supply of liquid lasts, there will be a partial vacuum, due to the resistance of the liquid to being drawn through pipes, until the supply gives out, when the incoming air will allow the suction to close the lower valve, opening the upper valve and allowing the intake of air, through the warning device, causing it to whistle.

Having thus described my invention I claim:

1. A device of the character described, comprising a housing, said housing having a suction connection, a vacuum connection, and a connection to the outside air, a valve interposed between said suction connection and said vacuum connection, another valve located in said third-named connection, said valves being so connected that when one is open the other is closed, and an alarm member in said third-named connection.

2. A device of the character described, comprising a housing, said housing having a suction connection, a vacuum connection, and a connection to the outside air, a valve interposed between said suction connection and said vacuum connection, another valve located in said third-named connection, and being smaller than said first-named valve, said valves being so connected that when one is open the other is closed, and an alarm member in said third-named connection.

3. A device of the character described, comprising a housing, said housing having a suction connection, a vacuum connection, and a connection to the outside air, an alarm member in said last-named connection, and valve mechanism for operating said alarm member when the vacuum in said second-named connection is broken.

4. A device of the character described, comprising a housing, said housing having a suction connection, a vacuum connection, and a connection to the outside air, a relatively large passage from said first-named to said second-named connection, a relatively small passage from said relatively large passage to said third-named connection, valve mechanism for controlling said passages, and a warning member located in said third-named connection and adapted to be operated when the vacuum in said second-named connection is broken.

In testimony thereof I affix my signature in the presence of two witnesses.

HAROLD T. BATTIN.

Witnesses:
   FRANCES E. BATTIN,
   WALTON STORM.

Dated December 30th, 1920.